United States Patent [19]

Zenker

[11] 4,287,781

[45] Sep. 8, 1981

[54] TRANSMISSION WITH DOUBLE FRICTION CLUTCH

[75] Inventor: Walter Zenker, Bergisch Gladbach, Fed. Rep. of Germany

[73] Assignee: Klöckner-Humboldt-Deutz Aktiengesellschaft, Cologne, Fed. Rep. of Germany

[21] Appl. No.: 76,087

[22] Filed: Sep. 17, 1979

[30] Foreign Application Priority Data

Sep. 21, 1978 [DE] Fed. Rep. of Germany ....... 2841053

[51] Int. Cl.[3] ...................... F16H 3/08; F16D 25/062; F16D 25/10

[52] U.S. Cl. .................................... 74/375; 192/87.1; 192/91 A

[58] Field of Search ................. 74/355, 356, 333, 361, 74/364, 376, 373, 377, 375; 192/48.6, 48.8, 48.9, 48.91, 70.28, 87.16, 87.15, 87.14, 87.1, 91 A; 188/71.4, 71.5, 366, 369, 72.5

[56] References Cited

U.S. PATENT DOCUMENTS 3,912,051 10/1975 Yokoi et al. ...................... 188/72.5

FOREIGN PATENT DOCUMENTS 1241744 8/1971 United Kingdom ................. 74/364

*Primary Examiner*—Allan D. Herrmann
*Attorney, Agent, or Firm*—Becker & Becker, Inc.

[57] ABSTRACT

Transmission with double friction clutch, especially transmission for agricultural and/or vehicles for the construction industry, with two gear shifting groups, each one of which can be shifted by means of an associated clutch, with the groups being shiftable under load. One of the clutches is engaged by being spring-biased and engageable by means of a selectively acting pressure medium adapted to operate one or several cylinder/piston units. The effective operating surface of the pertaining piston is greater than the operating surface of the piston associated with the second clutch. The cylinders are connectible in such a way that on each piston in each shift position thereof the same shifting pressure is exerted.

10 Claims, 1 Drawing Figure

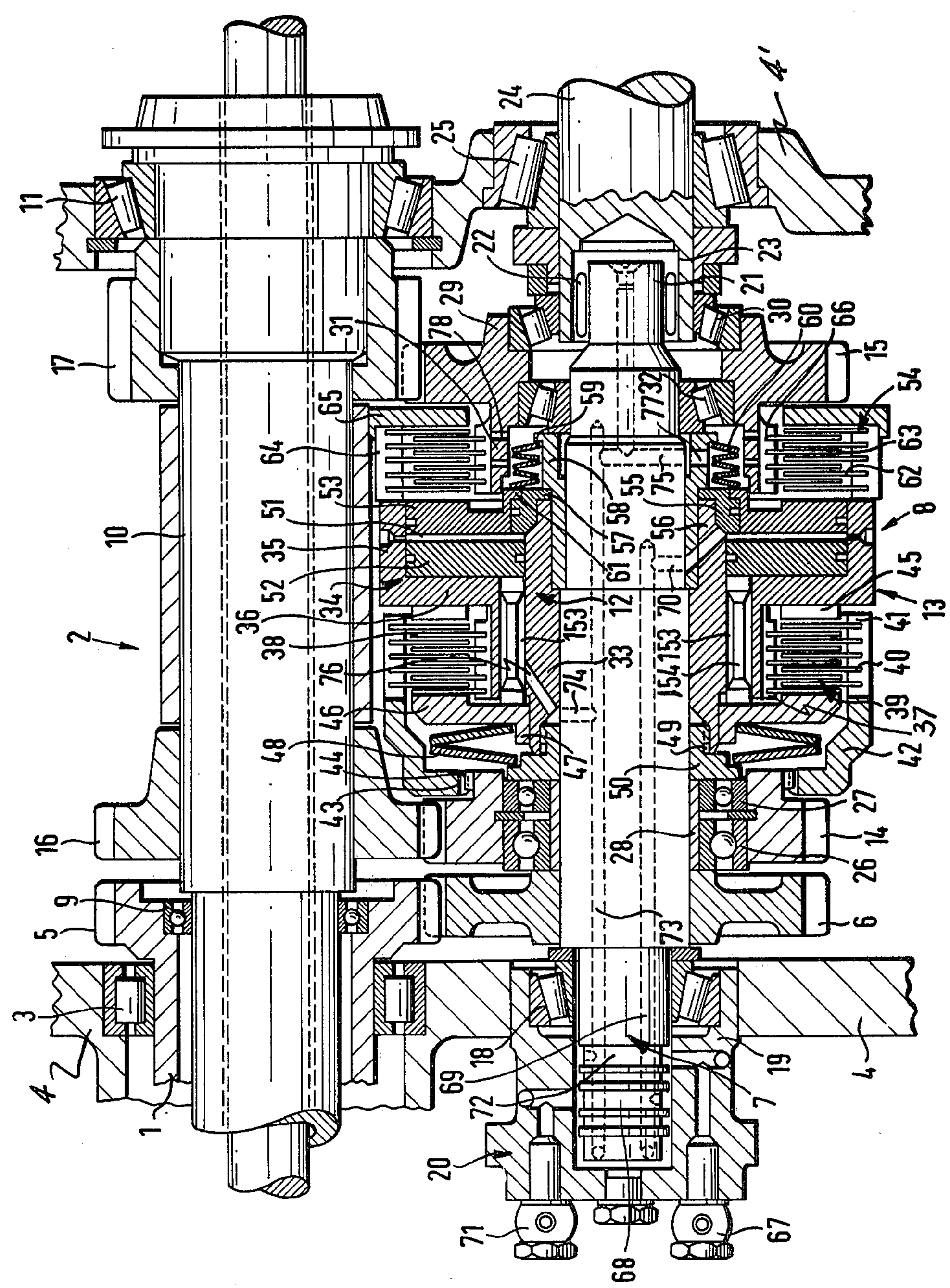

TRANSMISSION WITH DOUBLE FRICTION CLUTCH

The present invention relates to a gear wheel transmission, or change-speed transmission, especially for agricultural and/or vehicles for the construction industry, with two gear shifting groups, each one of which is shiftable or actuatable by means of the pertaining frictionally contactable or engageable shift clutch, with the gear shifting groups being shiftable under load. One of the two shifting or coupling clutches is movable to be disengaged by being spring-biased and movable into its operating or engaged position, by means of a selectively acting pressure medium adapted to operate one or several cylinder/piston units.

In transmissions of the aforementioned type, there exists the problem, when shifting under load, to carry out the transfer or transmission of the power from one of the speed stages to another in a smooth manner, i.e. substantially jerk or jolt-free.

It has been attempted to overcome this problem in known transmissions by arranging a piston for each shift clutch, with the piston having its own operating chamber and which piston would serve to attain the bracing or stressing the operating pressure is controlled in each one of these chambers by means of a pressure control valve, so that on opening of one of the first of the two shift clutches, e.g. on lowering of the control pressure to about one half, the closing pressure of the second clutch which, during disengaging of the first clutch is already engaged or actuated in parallel, if possible to attain the same value.

It is detrimental in this solution that the pressure control valve for control of the same overlap of the control pressures of the two shift clutches is particularly expensive and that the control pressure, controlled by the associated pressure control valve, is subjected to great fluctuations due to the viscosity of the pressure medium which, in turn, varies due to differing operating conditions.

Furthermore, in the event of a failure or breakdown of the starting system in such a solution it is detrimental that the towing of the drive machine will not be feasible since none of the two shift clutches can be engaged because the operating pressure is absent.

It is accordingly an object of the invention to improve a transmission so that the overlap of the torque which is transmitted by the two shift clutches can be controlled without a special pressure control valve, and that towing of the drive machine in the event of the failure of the start system is possible by utilization of one of the two shift clutches.

These objects and other objects and advantages of the invention will appear more clearly from the following specification in connection with the accompanying drawings, in which: the single FIGURE is a cross sectional, side elevational view of a transmission in accordance with one embodiment of the invention.

The transmission in accordance with the present invention is characterized primarily therein that one of the two shift clutches can be engaged by means of a spring-bias, and can be disengaged by means of at least one piston, with the effective or operating surface area of such piston or pistons being greater than the effective or operating surface area of at least one piston of the other, second, shift clutch which is enagageable by means of a pressure medium, and that the one, or the several, operating cylinder or cylinders of the two frictionally contacting shift clutches are operatively connected in such a way that on the pistons thereof, in each shift position thereof, the same shifting pressure is exerted.

By means of such a solution a uniform overlap of the torque to be transmitted is attained, irrespective of the viscosity of the pressure medium and without use of a special pressure control valve for control of the overlap of the pertaining control pressure in each shift clutch; such pressures are responsible for the torque to be transmitted, either on quick, or slow disengagement of the second clutch in contrast to the first shift clutch during all shift conditions or phases.

Furthermore, the transmissions in accordance with the invention are cost-saving and require only a compact space for the shift clutches and the associated control devices, and are realizable in simple constructions.

In accordance with the present invention, the displacement of the group transmission part or component is, furthermore, favorably affected thereby that the piston of both shift clutches have a common operating chamber in a cylinder component of a double row clutch.

In accordance with another embodiment of the invention, the piston of the two shift clutches is designed as an annular piston. The piston which is associated with the shift clutch which is engageable by spring-bias, has a lesser inner diameter than the other piston which is associated with the second shift clutch. Both pistons have the same outer diameter. Such an embodiment is preferred for reasons of production techniques.

In accordance with another embodiment of the invention, for provision of a solution which is preferred due to forging techniques for the primary component of the double friction clutch, it is contemplated that the primary component or part thereof includes a cup-shaped member including a radial member which, in turn, carries the cylindrical portion forming the outer cylinder of the two pistons. A contact profile for the primary clutch lamellae of the first clutch is arranged on a hub which is adjacent the radial member; the contact profile is associated with the radial member. The outer cylinder includes a member or cylindrical portion which extends so as to cover the piston or annular piston of the second clutch and this member also comprises a contact profile, but for the primary clutch lamellae of the second clutch.

In accordance with a further preferred embodiment to simplify the production of the system, in the inner bore of the piston of the second clutch there is provided a ring which can be placed with a predetermined play on the hub of the cup-shaped member. The ring can be axially secured with the hub by means of a bushing-like part which can be secured to the hub by means of screw threads.

Another preferred embodiment, which is preferred because of constructive and production technique reasons, is attained when the annular piston for engaging of the second clutch is provided with an inner shoulder adapted to serve as an axial abutment, which can be contacted, so as to disengage the second clutch, by way of a disc spring means preferably arranged within the secondary contact profile of the second clutch.

In order to achieve a particularly compact structure in axial direction, it is furthermore contemplated, in accordance with another preferred embodiment, that the secondary contact profile of the second clutch is in the form of an annular shoulder of the pertaining gear, which is actuated by this second clutch; this gear is journalled on the primary shaft, on which there can be arranged the cup-shaped member and on the coaxial shaft of an adjacent transmission group. It is advantageous herein that the disc spring means, associated with the second clutch and comprising several layers, is arranged between a shoulder-forming part of the ring and a shoulder-forming part of the bushing-like part that serves to secure the ring on the hub.

The overall length of the system is furthermore advantageously affected thereby that the spring for engaging the first clutch is provided between the gear, which can be driven due to the intervention of this clutch, and a pressure ring which is arranged on the hub and adapted to operatively contact the lamellae. Advantageously, this spring is in the form of a disc spring system or means comprising several layers with an effective plurality of pins being provided between the pressure ring and the piston serving to disengage the first clutch; the pins project through the hub portion.

Manufacture of such a system can be further advantageously affected thereby that the outer contact profile for the clutch lamellae that can be biased by springs, is provided by a cup-shaped part which surrounds the disc springs, and which is adapted to operatively engage with its teeth with the gear which is driven by it. In this case, in order to enhance assembly, it is advantageous that the disc springs of the first clutch are arranged between a ring and the hub, whereby the ring can be secured to the hub by screw threads.

Referring now particularly to the single FIGURE of the drawing, the reference numeral 1 identifies a drive shaft of a group transmission part 2 (also referred to as group transmission) having two forward stages engageable under load. The drive shaft 1 can be operatively connected to a drive system, not shown, by the intervention of a friction clutch which serves as a start clutch, also not shown.

Aside from a journal, not shown, near the start clutch, the drive shaft 1 is journalled with its other end portion by means of a journal 3 in the wall 4 of the housing of the group transmission 2. A gear wheel 5 is integrally formed at the end of shaft 1 which has been shown in the drawing. The gear wheel 5 is adapted to mesh with an intermediate gear 6 which is keyed by means of teeth, not shown, to an intermediate shaft 7 which serves as primary shaft of a clutch connection arrangement 8.

At the right end of shaft 1 there is journalled, by means of a bearing 9, an input shaft 10 which serves as the output shaft of the group transmission 2. The shaft 10 also forms part of a gear shift transmission or gear shift transmission component and is directly journalled with its right end portion in the wall 4' of the housing by means of a bearing 11.

The input shaft 10 is driven by means of the intermediate shaft 7, as will be more readily understood as the specification proceeds, with a hub-like primary part 12 of a double friction clutch 13 being operatively connected to shaft 7, so that by means of double friction clutch 13 and intermediate shaft gear 14 or 15 the gears 16 and 17 of the input shaft 10 are selectively engaged.

The left end of the intermediate shaft 7 is journalled in housing wall 4 by means of a bearing 18 and a shoulder 19, which is adapted to contain the bearing 18, of the pressure medium feed device 20 in housing wall 4. The right end of the intermediate shaft 7 is journalled by means of a reduced portion 21 and a bearing 22 in the axial bore 23 of the shaft 24.

Shaft 24 extends coaxial to the intermediate shaft 7 in housing wall 4 and is adapted to be driven by gears, not shown, of the shift transmission component part. This shaft 24 is also referred to as intermediate shaft or driven shaft. The driven shaft 24 of the gear shaft transmission component part is journalled with its left end in a tapered roller bearing 25 which is secured in housing wall 4'.

On the intermediate shaft 7 there is secured the intermediate gear wheel 14 journalled by bearings 26 and 27 so that it is freely rotatable, with a bushing 28 also being provided between the intermediate gear 6 and the hub-like primary part 12 of the double friction clutch 13. In contrast thereto, the intermediate gear 15 arranged between the primary part 12 and the bearing 25, is journalled with a right shoulder 29, by a tapered roller bearing 30 of the driven shaft 24. A cup-shaped part 31 on the left of gear 15 is journalled by a tapered roller bearing 32 on the right end of the intermediate shaft 7.

The primary part 12 of the double friction clutch 13 comprising a hub 33 and a cup-shaped member 34 having a cylindrical portion 35 is connected by a radial member 36 to the hub 33. The hub 33 is outwardly provided with a primary contact profile 37 adapted to operatively contact the primary clutch lamellae 38 of first clutch 39 of the double friction clutch 13. The primary clutch lamellae 38 are associated with secondary clutch lamellae 40 which are keyed to a cup-shaped part 42. The lamellae 40 are axially shiftable by means of a secondary contact profile 41 of part 42.

The cup-shaped part 42 is coupled to gear 14 by means of an inner gear 43. For this purpose, the gear 14 is provided with a gear ring section 44. For operatively connecting the primary and the secondary clutch lamellae 38 and 40, there is provided between these and the radial member 36, a friction ring 45 and a pressure ring 46. The pressure ring 46 has a shoulder 47 and is arranged ahead of the primary and secondary clutch lamellae 38 and 40, respectively. For operatively connecting the clutch lamellae 38 and 40, by intervention of the pressure ring 46 and the friction ring 45, there is provided a spring group comprising two disc springs 48. One of the two disc springs 48 is radially guided on the shoulder 47 of the pressure ring 46, while the other disc spring 48 is supportable on an annular thrust ring 50 which is connectible by means of screw threads 49 to the hub 33. The cylindrical portion 35 of the cup-shaped member 34 provides a cylindrical chamber 51 in which an annular piston 52 having outer and inner seals is guided. This piston 52 is positioned away from the member 36 by the operating distance of clutch 39.

When the chamber 51 is pressurized, the piston 52 acts, by means of pins 154 which are arranged in circumferentially evenly spaced bores 153 of hub 33, on the pressure ring 46 in the sense that the first clutch 39 is disengaged.

On the hub 33 in the region of the cylindrical part 35 on a shoulder 56 there is positioned a stepped ring 55. Ring 55 forms a working cylinder for an annular piston 53 for the second clutch 54 of the double friction clutch 13. The stepped ring 55 includes a radially inwardly directed shoulder 57 by means of which the ring 55 is operatively connectible to hub 33 of part 12, with a bushing-like screw part 58 having an outer screw threading for operatively connecting it to hub 33 of part 12. The part 58 has a radially outwardly directed shoulder 59 on which a spring disc arrangement 60 can be arranged, with one end, while the other end of the spring disc arrangement 60 can be supported by, or abuts, the shoulder 61 of the piston 53. The shoulder 61 of piston 53 is adapted to extend above the ring 55, so that the piston 53 is urged to disengage the second clutch 54. The annular piston 53 is directed with its effective operating surface toward the cylindrical chamber 51 and acts, on pressurizing of the chamber 51 by a pressure medium, on the primary and secondary clutch lamellae 62 and 63 of the clutch 54. The primary lamellae 62 are held rotation-fast and axially movable by a primary contact profile 64 arranged in the cup-shaped member 34. As axial counterbearing for the clutch lamellae 62 and 63 there is provided a friction disc 65 which is connected by screws, not shown, to the cup-shaped member 34. The secondary clutch lamellae 63 are keyed and axially movable on a secondary contact profile 66 of the cup-shaped part 31 of the gear 15 so as to be radially and axially shiftably guided.

The disc springs 48 are provided in such a way that on attaining of half of the closing pressure for the clutch lamellae 62 and 63, on pressurizing of the annular piston 53, an approximately equal torque is transmitted by the second clutch 54 and by the first clutch 39. Pressurizing of the chamber 51 by a higher pressure causes that the clutch 39 is further disengaged in conformity with the characteristic of spring 48. Thus, the second clutch 54, which is engaged by the pressure medium when the clutch 39 is fully disengaged, is engaged and the torque, transferred via intermediate shaft 7, is transferred to its associated pair of gears 15 and 17, the transmission ratio or relation of which is smaller in comparison to the pair of gears 14 and 16.

The pressure medium for disengaging and engaging of the two clutches 39 and 54 is passed to the chamber 51 from the pressure medium feed device 20 by means of conduit 67, an annular channel 68, a conduit 69, and a further transverse conduit 70.

For cooling of the clutch lamellae 39, 40 and 62, 63 of the clutches 39 and 54, respectively, when required the cooling medium, which can be the lubricating oil for the system, is passed via a conduit 71 of the pressure medium feed device 20 to the lamellae. Thus, the pressure medium is fed from the pressure medium feed device 20 through a conduit 71, an annular channel 72, and a longitudinal conduit 73. Line 74 and transverse bore 76 in hub 33 communicate conduit 73 with the lamellae 40 and 41 and with the pertaining primary contact profile 37, while transverse bore 77 in screw part 58 and transverse bores 78 in the cup-shaped part 31 of gear 15 serve to communicate conduit 73 with clutch lamellae 62 and 63 of clutch 54 and the pertaining secondary contact profile 66.

It should be mentioned that the present invention is not limited to the embodiment indicated in the drawing. Instead of the pair of gears 15 and 17, there can be utilized a reversal stage in the group transmission part; such reversal stage is selectively actuatable in the same way by means of the clutch 54. The reversal stage would comprise a gear such as gear 15, a reversal gear, and a gear which is keyed to a shaft such as shaft 10 and adapted to mesh with the reversal gear. Furthermore, the reversal stage can be provided between gear 14 and the input shaft 10. The first solution with an intermediate reversal system between the gear 15 and input shaft 10 is, however, preferred, since in such a case the towing of the tractor, due to failure of the starting system of the drive motor, could be carried out by using the forward intermediate system with gears 14 and 16.

The present invention is, of course, in no way restricted to the specific disclosure of the specification and drawing, but also encompasses any modifications within the scope of the appended claims.

What I claim is:

1. A gear change transmission, especially for agricultural vehicles and construction-industry vehicles, having two gear-shifting groups each being actuatable under load by a friction clutching arrangement comprising:

a first clutch inherently urged to engagement by means of a resilient biasing member and adapted to be disengaged by means of at least one piston-cylinder unit having at least one piston; and a second clutch adapted to be engaged by means of at least one piston-cylinder unit, having at least one piston, said at least one piston of said second clutch having an effective operating surface area which is less than the effective operating surface area of said at least one piston of said first clutch, with the pertaining cylinders of each of said first clutch and said second clutch being connectible in such a way that said at least one piston of said first clutch and said at least one piston of said second clutch are subjected to the same control pressure in each clutch position, said first clutch and said second clutch forming a double friction clutch, and said at least one piston of said first clutch and said at least one piston of said second clutch being operable in a common cylinder chamber member, said double-row clutch comprising a primary part, said primary part including:

a hub part;

a radial member projecting radially from said hub part between said first clutch and said second clutch;

a cylindrical portion projecting axially from said radial member on that side thereof which faces said second clutch, said cylindrical portion being spaced from said hub and concentric thereto, said cylindrical member and said radial member forming a cup-shaped member with the annular space between said hub and said cylindrical portion forming said cylinder chamber for said at least one piston of said first clutch and said at least one piston of said second clutch;

said first clutch including secondary clutch lamellae, and primary clutch lamellae, and said second clutch including primary lamellae and secondary lamellae;

a first contact profile, on said hub radially inwardly of said lamellae of said first clutch on that side of said radial member which faces said first clutch, for engaging said primary lamellae of said first clutch; and a second contact profile on said cylindrical portion radially outwardly of said lamellae of said second clutch on that side of said radial member which faces said second clutch, for engaging said primary lamellae of said second clutch.

2. A gear change transmission according to claim 1, wherein said at least one piston of said first clutch and said at least one piston of said second clutch are designed as annular pistons; said at least one annular piston of said first clutch having an inner diameter which is less than the inner diameter of said at least one annular piston of said second clutch, and the pertaining outer diameters of each of said at least one annular piston of said first clutch and said at least one annular piston of said second clutch being equal.

3. A gear change transmission according to claim 1, including a ring locatable on said hub part radially inwardly of said at least one piston of said second clutch to surround said hub part with a predetermined play to form part of said chamber, and further comprising a bushing-type threadable piece with a portion thereof being adapted to be concentrically received in said hub part, said ring being adapted to be axially secured relative to said hub part by means of said bushing-type piece.

4. A gear change transmission according to claim 3, wherein said at least one second piston has a radially inwardly projecting shoulder serving as an axial abutment, and wherein said second clutch comprises disc spring means for disengaging said second clutch, said shoulder being contactable by said disc spring means.

5. A gear change transmission according to claim 3, and further comprising:

a walled housing:

a first shaft having a first end journalled in said housing, said shaft receiving in the vicinity of its end remote from said journalled end, said hub and said bushing-type piece;

a second shaft extending coaxially to said first shaft and having a first end journalled in said housing and being adapted at its other end to journal said remote end of said first shaft;

a first gear operatively connectible to, and journalled at the interface of, said first and second shafts, said gear having an annular projection located radially inwardly of said second clutch on that side of said gear which faces said second clutch; and a third contact profile located radially inwardly of said lamellae of said second clutch and operatively connectible to said annular projection of said gear on that side of said gear which faces said second clutch, for engaging said secondary lamellae of said second clutch.

6. A gear change transmission according to claim 5, wherein said disc spring means is locatable within at least part of said annular projection.

7. A gear change transmission according to claim 5, wherein said ring includes a radial shoulder and wherein said bushing-type piece includes a radial shoulder, said disc spring means being arranged between said radial shoulder of said ring and said radial shoulder of said bushing-type piece.

8. A gear change transmission according to claim 5, and further comprising:

a second gear operatively connectible to said first shaft in the vicinity of that end thereof which is journalled in said housing;

a pressure ring locatable on said hub part, said pressure ring loading said lamellae of said first clutch on that side thereof remote from said radial member, said resilient biasing member of said first clutch including a multi-stage disc spring and being arranged between said pressure ring and said second gear; and a plurality of pins in said primary part extending longitudinally between said at least one piston of said first clutch and said pressure ring.

9. A gear change transmission according to claim 8, and further comprising:

a third gear operatively connectible to said first shaft between said resilient biasing member and said second gear;

a cup-shaped part engageable with said third gear and surrounding said resilient biasing member; and a fourth contact profile located radially outwardly of said lamellae of said first clutch and operatively connectible to said cup-shaped part.

10. A gear change transmission according to claim 9, and further comprising a thrust ring between said third gear and said hub part on said first shaft, said resilient biasing member being arranged between said thrust ring and said pressure ring.

* * * * *